United States Patent
Cha et al.

(10) Patent No.: US 10,868,897 B2
(45) Date of Patent: Dec. 15, 2020

(54) ROLL-SLIDE MOBILE TERMINAL

(71) Applicant: LG ELECTRONICS INC., Seoul (KR)

(72) Inventors: Youngdo Cha, Seoul (KR); Dongsung Kim, Seoul (KR); Sunglyong Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/548,767

(22) Filed: Aug. 22, 2019

(65) Prior Publication Data
US 2020/0304613 A1    Sep. 24, 2020

Related U.S. Application Data

(60) Provisional application No. 62/820,224, filed on Mar. 18, 2019.

(30) Foreign Application Priority Data

Apr. 25, 2019  (KR) .................. 10-2019-0048568

(51) Int. Cl.
*H04B 1/38*    (2015.01)
*H04M 1/02*    (2006.01)

(52) U.S. Cl.
CPC ....... *H04M 1/0237* (2013.01); *H04M 1/0268* (2013.01)

(58) Field of Classification Search
CPC ............ H04M 1/0237; H04M 1/0268; H04M 1/0235; H04M 1/0414; H04M 1/0208; H04M 1/0222; H04B 1/03
See application file for complete search history.

(56) References Cited

U.S. PATENT DOCUMENTS

2010/0314399 A1* 12/2010 George .............. B65D 77/0486
                                                            220/600
2014/0380186 A1   12/2014 Kim et al.
(Continued)

FOREIGN PATENT DOCUMENTS

CN     206301242     7/2017
KR    1020140059274  5/2014

OTHER PUBLICATIONS

PCT International Application No. PCT1KR20191009674, Notification of Transmittal of the International Search Report and the Written Opinion of the International Searching Authority, or Declaration dated Dec. 17, 2019, 11 pages.

*Primary Examiner* — Tuan Pham
(74) *Attorney, Agent, or Firm* — Lee, Hong, Degerman, Kang & Waimey

(57) ABSTRACT

Disclosed is a mobile terminal comprising a first frame comprising a plurality of first support portions extended in a horizontal direction, and vertically spaced a preset distance apart from another one of the plurality of first support portions; a second frame comprising a plurality of second support portions provided between respectively corresponding first support portions and configured to slidingly move relative to the first frame in the horizontal direction, causing a change from a first state to a second state in which the mobile terminal is expanded; and a flexible display comprising a first area provided on a front surface of the first plurality of first support portion; and a second area provided on a rear side of the first area by being folded to surround the second frame.

15 Claims, 10 Drawing Sheets

(56) References Cited

U.S. PATENT DOCUMENTS

| | | |
|---|---|---|
| 2016/0147261 A1 | 5/2016 | Bohn et al. |
| 2017/0255271 A1* | 9/2017 | Kang .................... G06F 1/1626 |
| 2018/0188778 A1* | 7/2018 | Shin ...................... G06F 1/1652 |
| 2019/0230803 A1* | 7/2019 | Liao ......................... A44C 5/00 |

* cited by examiner

FIG. 6
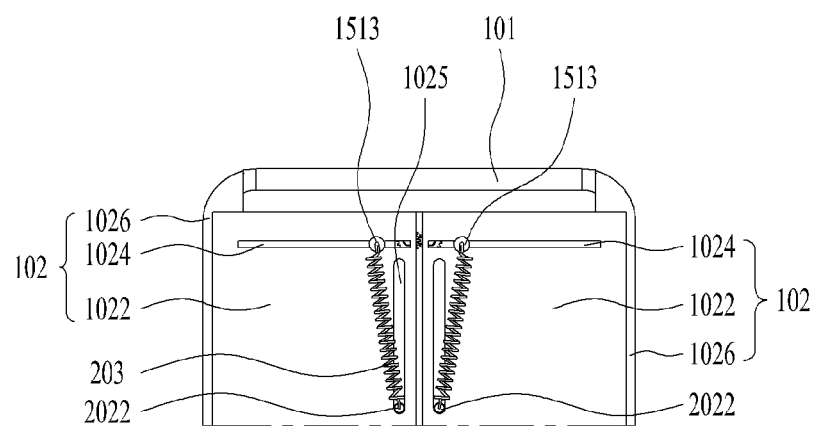
(a)
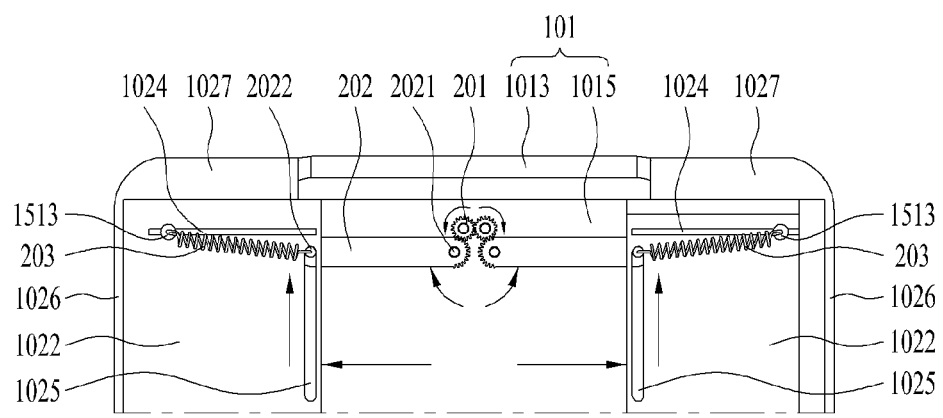
(b)

FIG. 7
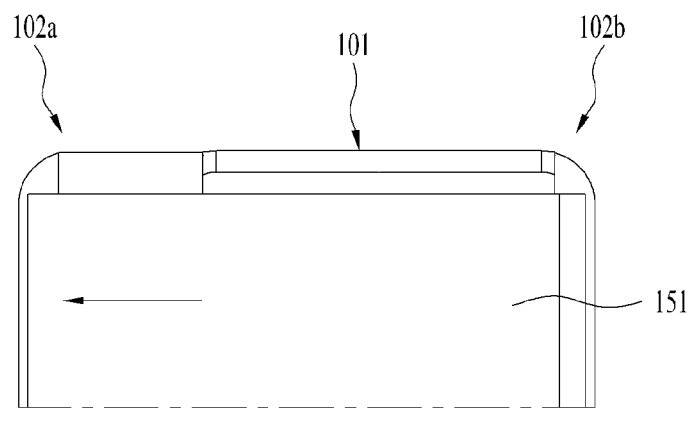
(a)
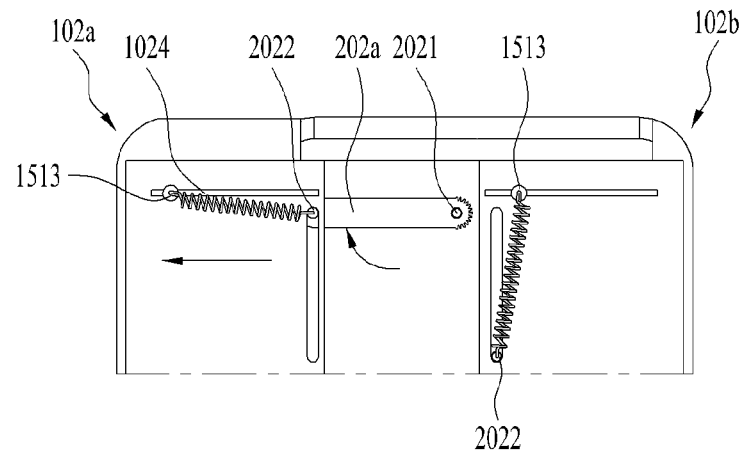
(b)

FIG. 8
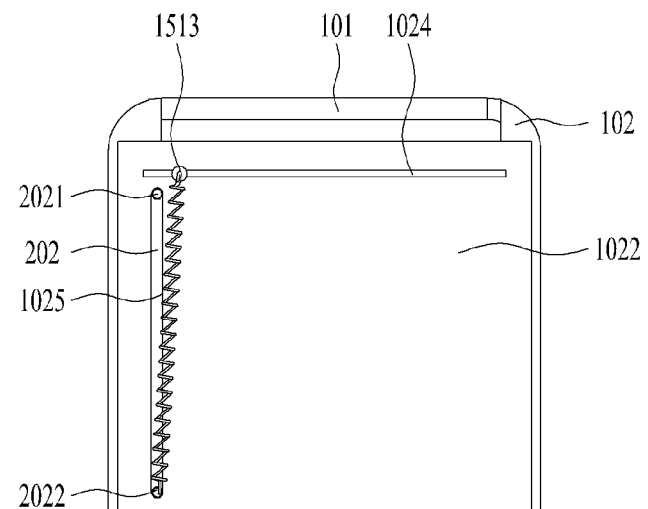
(a)
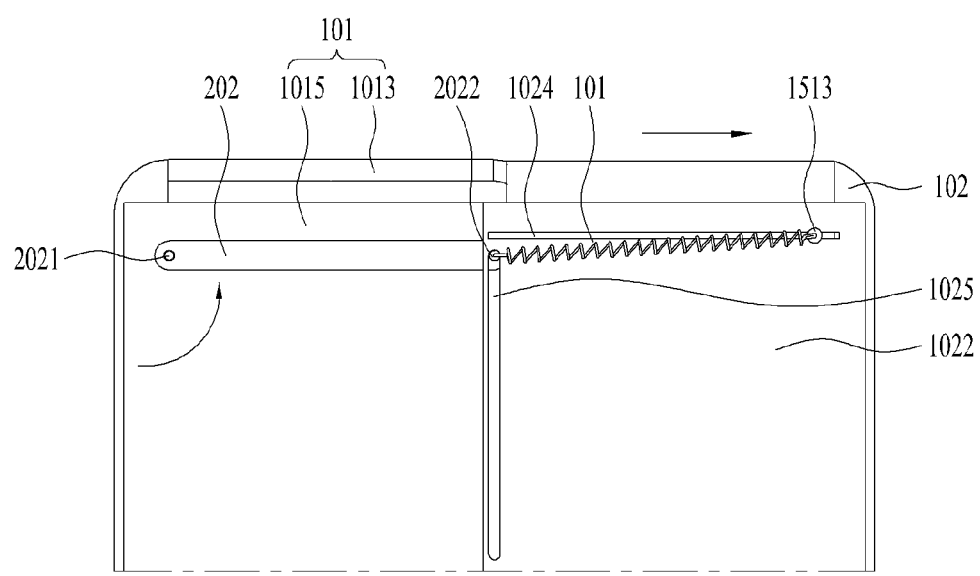
(b)

FIG. 9
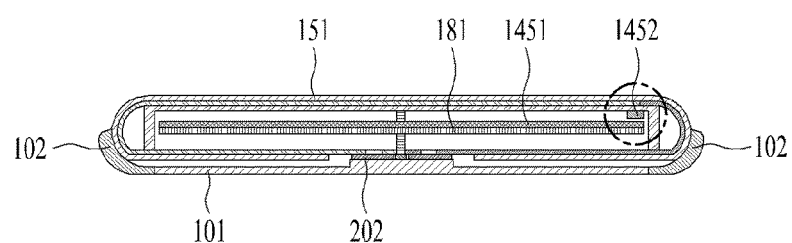
(a)
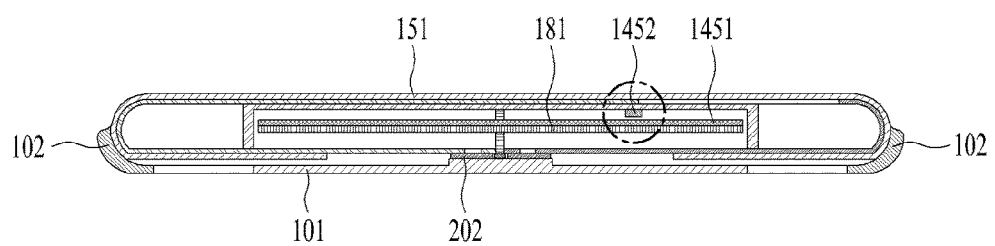
(b)
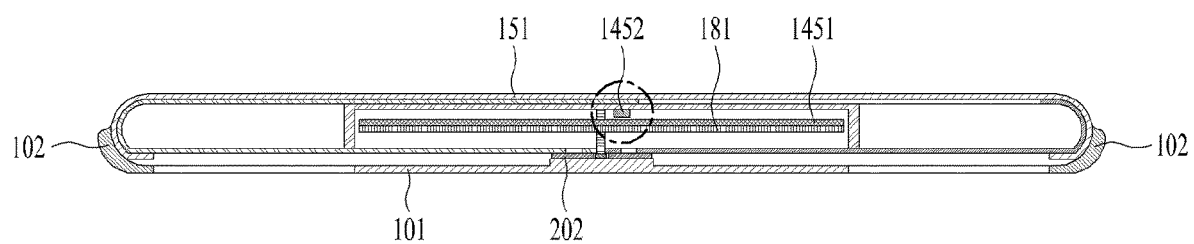
(c)

FIG. 10
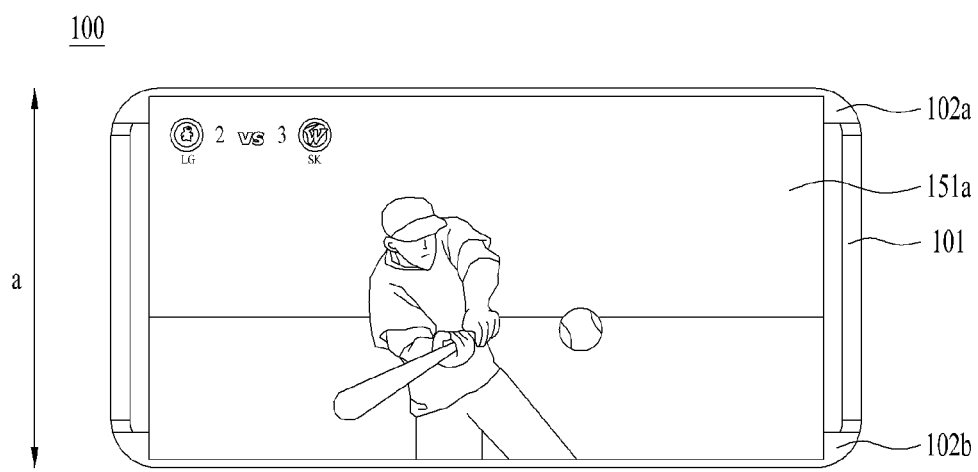
(a)
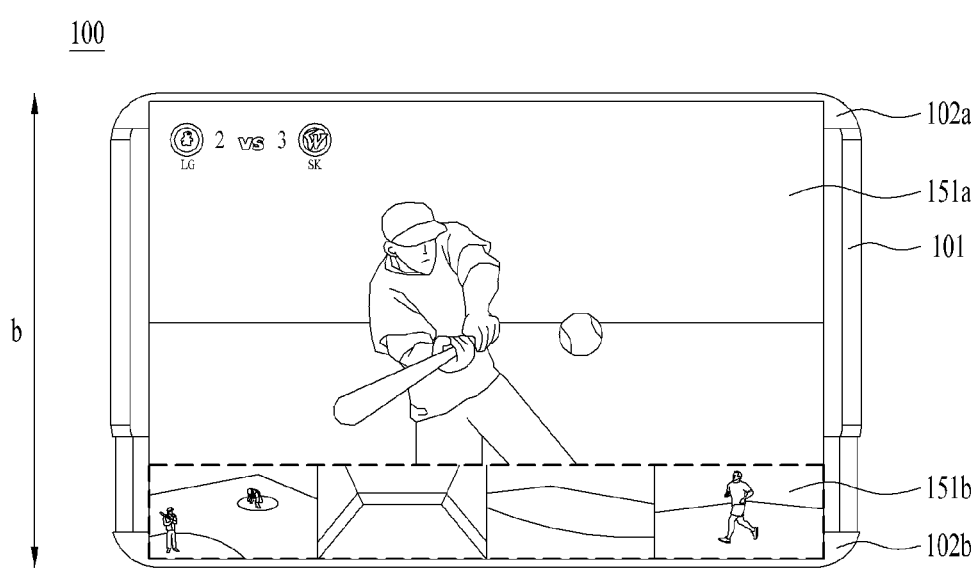
(b)

ROLL-SLIDE MOBILE TERMINAL

CROSS-REFERENCE TO RELATED APPLICATIONS

Pursuant to 35 U.S.C. § 119, this application claims the benefit of U.S. Provisional Application No. 62/820,224 filed on Mar. 18, 2019 and also claims the benefit of earlier filing date and right of priority to Korean Patent Application No. 10-2019-0048568 filed on Apr. 25, 2019, the contents of which are hereby incorporated by reference in their entirety.

BACKGROUND OF THE DISCLOSURE

Field of the Disclosure

The present invention relates to a mobile terminal, and more particularly, to a roll-slide mobile terminal having a flexible display and capable of extending a size of a screen.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device equipped with functions of receiving, processing and displaying user-viewable images. The display device, for example, receives broadcasting selected by a user from broadcast signals broadcasted by a broadcasting station, splits video signals from the received signals, and displays the split video signals on a display.

Recently, owing to the developments of broadcast and network technologies, functions of a display device have been considerably diversified and performance of the device has been improved correspondingly. Namely, the display device has been developed so as to provide a user with various contents as well as simply broadcasted contents. For example, the display device can provide game play, listening to music, Internet shopping, user-customized information and the like using various applications as well as programs received from broadcasting stations. In order to perform such extended functions, the display device is basically connected to other devices or a network using various communication protocols and is able to provide ubiquitous computing environments to a user. Namely, the display device has been evolved into a smart device that enables connectivity to a network and ubiquitous computing.

Recently, a flexible display having sufficient elasticity to enable big deformation has been developed. The flexible display may be deformed to be rolled. A mobile terminal receives the rolled flexible display and may protrude the display to the outside of its body at a desired size. Therefore, the mobile terminal may have a more compact size in accordance with a use of the flexible display. Also, as the mobile terminal comprises such a rollable display, the mobile terminal may be referred to as a rollable mobile terminal.

In order to use the rollable mobile terminal, a user may eject the display from a body of the mobile terminal and at the same time the display may be extended to a size desired by the user. However, the display may be extended to various directions by the user, and relative alignment or arrangement of the display for the user may be varied depending on the extended direction. Therefore, in order to allow the user to view intended contents or screen, the mobile terminal needs to align contents or screen on the display in consideration of the varied display or relative alignment of the user. Moreover, the mobile terminal additionally needs to adjust the aligned contents in consideration of the extended direction and alignment.

SUMMARY OF THE DISCLOSURE

Accordingly, an object of the present invention is to address the above-noted and other problems and provide a roll-slide mobile terminal capable of improving durability of a flexible display unit as a point where the flexible display unit is folded is limited to a specific position.

Another object of the present invention is to provide a roll-slide mobile terminal comprising a support structure of a flexible display unit, in which the flexible display unit may stably be supported when it is extended.

A further object of the present invention is to provide a roll-slide mobile terminal including a side unit configured to protect a folded area of a flexible display unit so as to prevent the damage of the flexible display unit caused by an external shock.

Embodiments of the present disclosure may provide a mobile terminal comprising a first frame comprising a plurality of first support portions, each of the plurality of first support portions extended in a horizontal direction and vertically spaced a preset distance apart from another one of the plurality of first support portions; a second frame comprising a plurality of second support portions, each of the plurality of second support portions provided between respectively corresponding first support portions, wherein the plurality of second support portions are configured to slidingly move relative to the first frame in the horizontal direction, causing a change from a first state to a second state in which the mobile terminal is expanded; and a flexible display comprising a first area provided on a front surface of the plurality of first support portions and a second area provided on a rear side of the first area by being folded to surround the second frame.

The first frame may further comprise a front portion in which the plurality of first support portions are provided and a rear portion configured to cover a rear surface of the second frame, the plurality of first support portions may be projected from the front portion towards the front surface by a height corresponding to a thickness of the plurality of second support portions, and the plurality of second support portions may be provided on a front surface of the front portion.

The first frame may comprise a first side portion configured to form exterior designs of upper lower sides.

The second frame may comprise a second side portion inserted in the first side portion and configured to be exposed outside in the second state.

The second frame may comprise a curved portion coupled with the plurality of second support portions and located in a curved area of the flexible display unit.

The roll-slide mobile terminal may further comprise a third side portion configured to cover at least a predetermined area of a third area provided in the flexible display unit that surrounds the curved portion.

The second frame may further comprise a third support portion provided in a front surface of the second area of the flexible display unit and configured to support the second area of the flexible display unit, and the third support portion may be connected with the curved portion and extended in parallel with the second support portions.

The roll-slide mobile terminal may further comprise a slide slot formed in the third support portion in a horizontal direction; and a slide projection projected from one end of the flexible display unit and configured to be inserted in the slide slot and move along the slide slot when the second frame sliding-moves.

The roll-slide mobile terminal may further comprise a drive unit configured to move the third support portion in a horizontal direction, wherein the drive unit comprises a drive slot extended from the third support portion in a vertical direction; a link having one end rotatably coupled to the first frame; and a drive projection projected from the other end of the link and inserted in the drive slot.

The roll-slide mobile terminal may further comprise a pair of second frames, each of the pair of second frames coupled to a respectively corresponding horizontal side of the first frame, wherein the pair of second frames are configured to slide in the reverse directions; and a pair of links rotatably coupled to the center of the first frame and configured to be rotatable in the reverse directions.

The roll-slide mobile terminal may further comprise a pair of first saw-toothed wheels, each first saw-toothed wheel formed in ne ends of formed in one ends of a corresponding one of the pair of links; and a pair of second saw-toothed wheels, each second saw-toothed wheel configured to be rotatable by engaging with a corresponding one of the pair of first saw-toothed wheel, wherein the pair of second saw-toothed wheels are rotated in the reverse directions by engaging with each other.

The roll-slide mobile terminal may further comprise a slide slot formed in the third support portion in a horizontal direction; a slide projection projected from one end of the flexible display unit and configured to be inserted in the slide slot and move along the slide slot when the second frame sliding-moves; and an elastic member provided between the slide projection and the other end of the link.

The first frame may comprise a front portion in which the first support portions are provided; a rear portion configured to cover a rear surface of the second frame; and a first reinforcement portion provided in a position not overlapping with the second frame and having a corresponding thickness to a space formed between the front portion and the rear portion.

The first frame may further comprise a second reinforcement portion having a corresponding thickness to a space formed between the third support portion and the front portion.

The roll-slide mobile terminal may further comprise a main board and a battery that are loaded in the first frame; a fixed sensing unit extended on the main board in a horizontal direction; a movable sensing unit coupled to the second frame and configured to be movable in a state of contacting with the fixed sensing unit when the first state is changed into the second state; and a control unit configured to sense a position of the movable sensing unit on the fixed sensing unit and calculate the extent of the first area provided in the flexible display unit based on the result of the sensing, and further configured to output an image on the first area.

Since the roll-slide mobile terminal of the present invention does not limit a point where the flexible display unit is folded to a specific position, durability of the flexible display unit may be improved.

Also, since the flexible display unit may stably be supported when it is extended, it is possible to minimize difficulty in a touch input.

Also, the flexible display unit from may be prevented from being damaged by external impact at a side where the flexible display is folded by the side unit provided to protect the folded side of the flexible display.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 6 is diagram illustrating a third support unit and a drive unit that are provided in a second frame of the roll-slide mobile terminal;

FIGS. 7 and 8 are diagrams illustrating another embodiment of the roll-slide mobile terminal according to the present invention;

FIG. 9 is a diagram to describe a sensing unit of the roll-slide mobile terminal; and FIG. 10 is a diagram to describe control of an output screen displayed based on the sensing result of the sensing unit.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
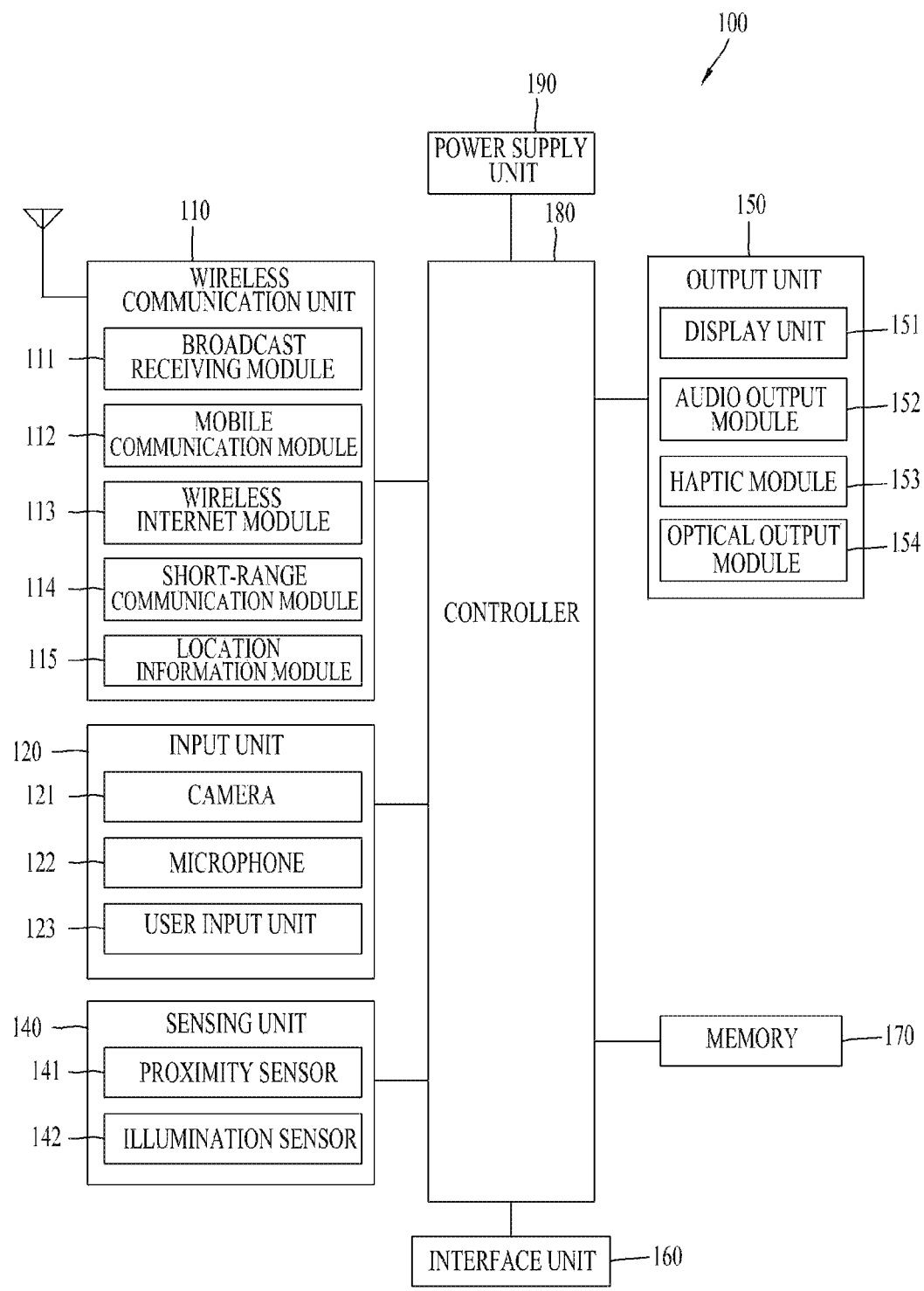
FIG. 1 is a block diagram of a role-slide mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
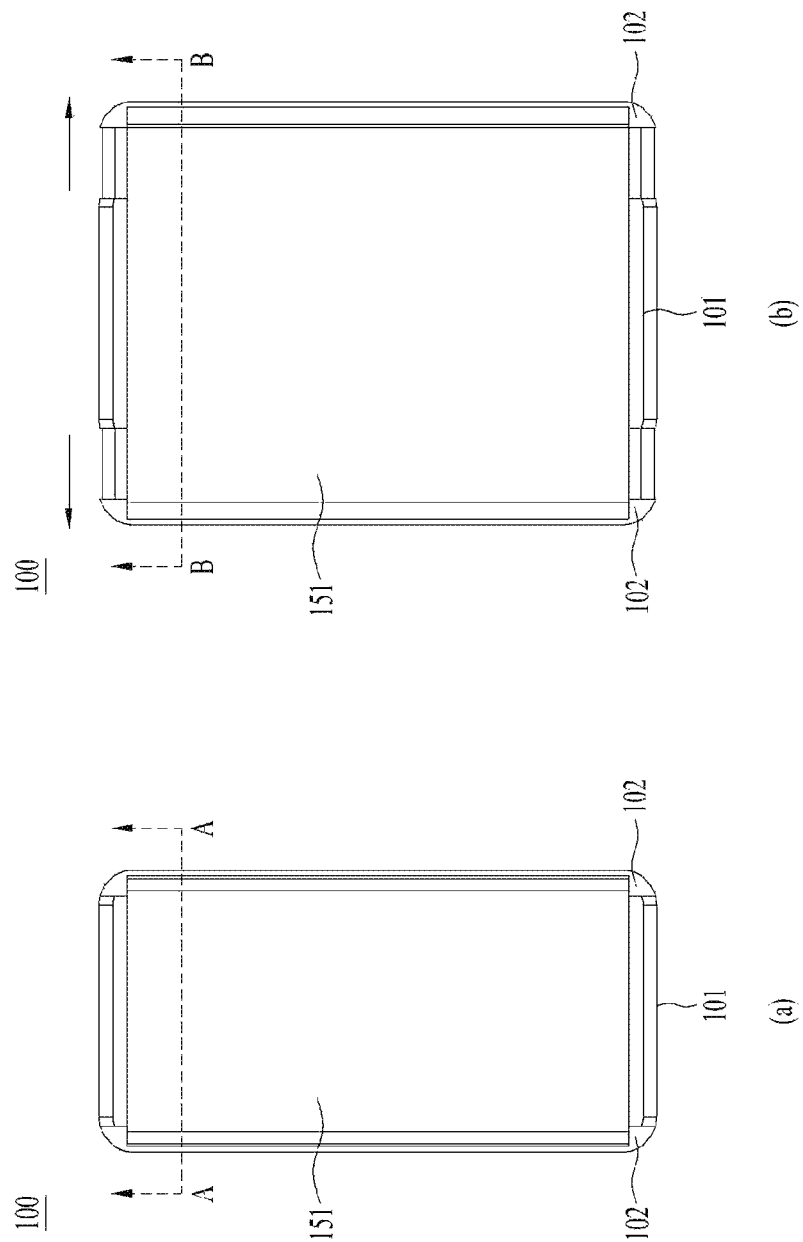
FIG. 2 is a perspective view illustrating a first state and a second state when a roll-slide mobile terminal according to the present invention is viewed at one side.
Figure 3:
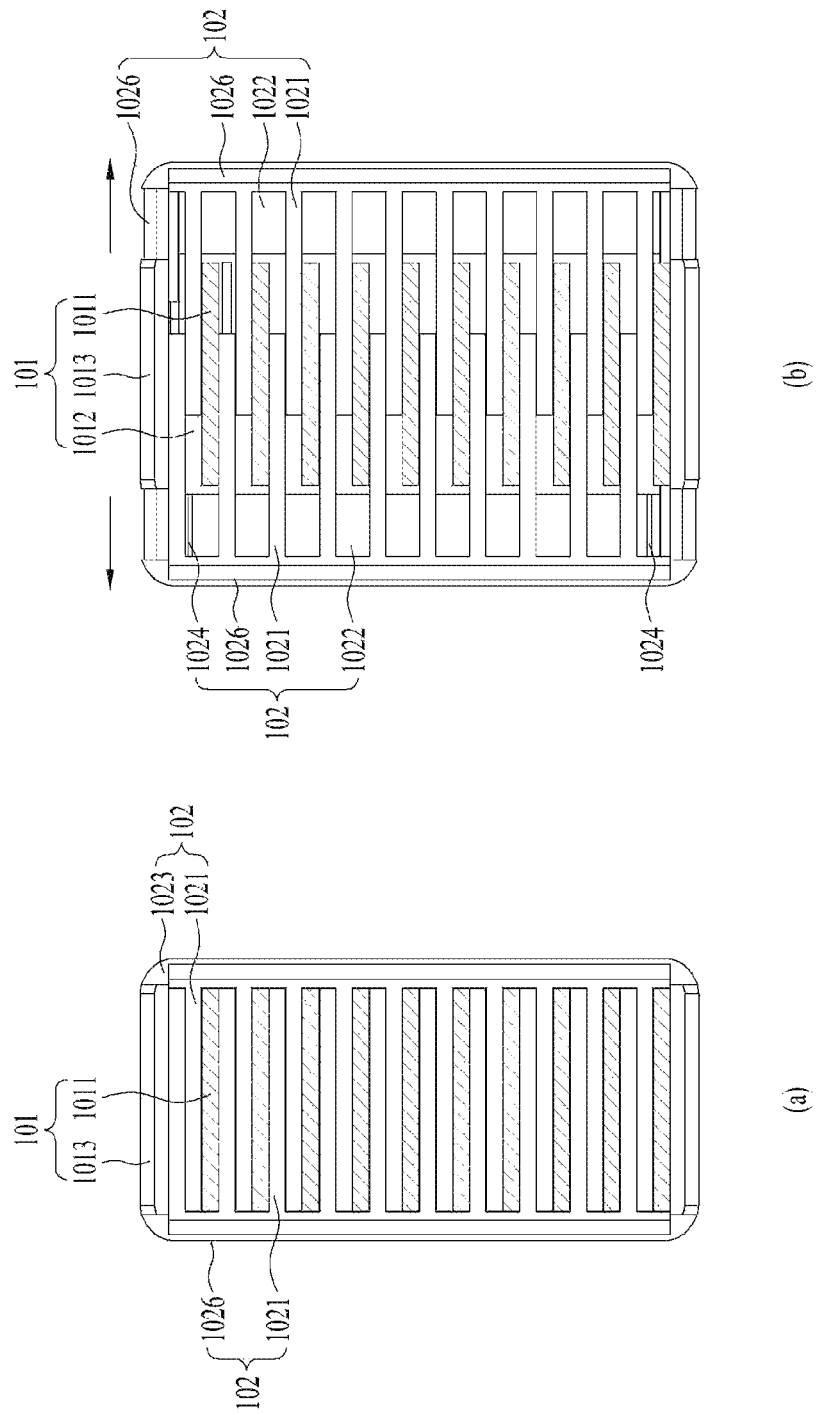
FIGS. 3 and 4 are front views illustrating the first state and the second state, without a flexible display unit provided in the roll-slide mobile terminal.
Figure 4:
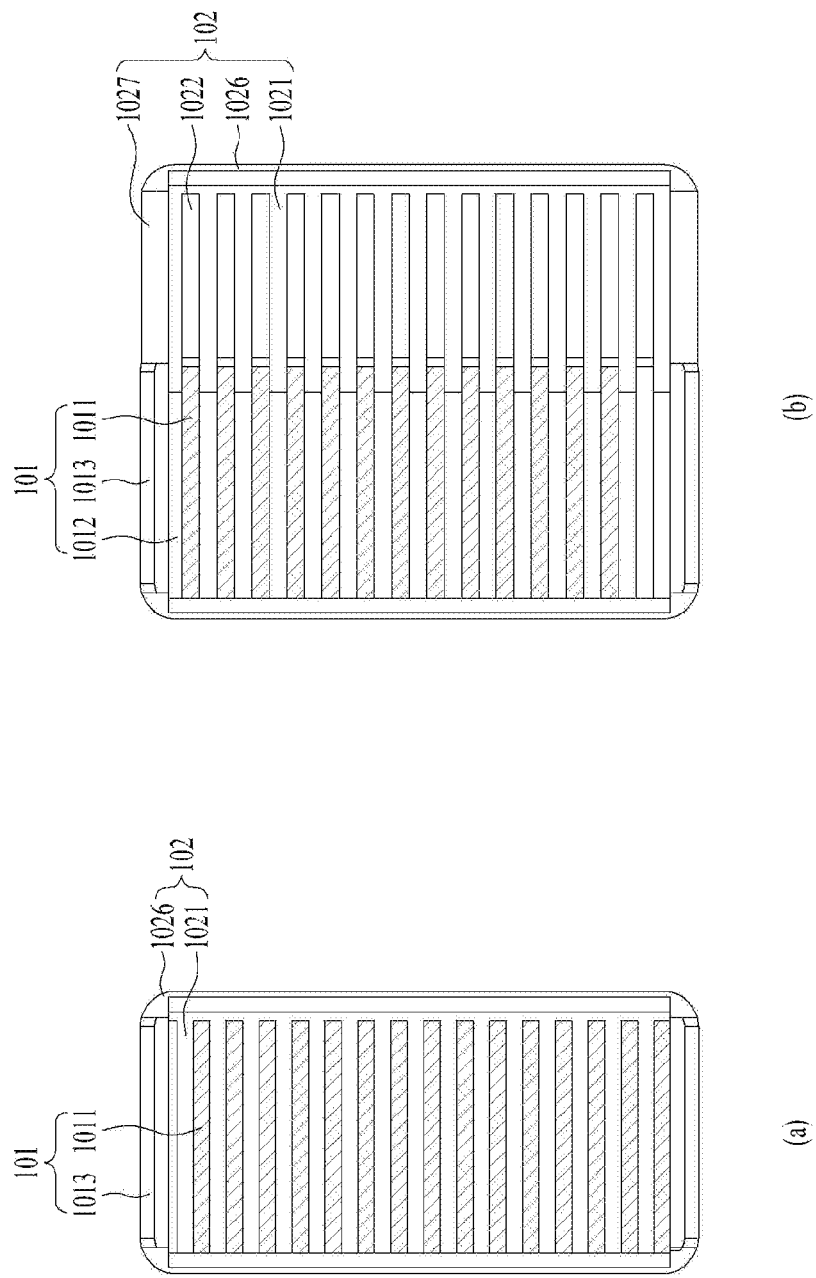

FIG. 2 is a perspective view illustrating a first state and a second state when a roll-slide mobile terminal according to the present invention is viewed at one side and FIG. 3 is a front view illustrating the first state and the second state without the flexible display unit 151 provided in the roll-slide mobile terminal 100. FIG. 4 is a front view illustrating a first state and a second state without a flexible display unit 151 provided in another embodiment of the roll-slide mobile terminal 100.

FIGS. 2 (a). FIG. 3 (a) and FIG. 4 (a) illustrate the first state of the roll-slide mobile terminal 100 according to one embodiment of the present invention. FIG. 2 (b), FIG. 3 (b) and FIG. 4 (b) illustrate the second state of the roll-slide mobile terminal 100 according to one embodiment of the present invention.

The roll-slide mobile terminal 100 of the first state has a size smaller than that of the roll-slide mobile terminal 100 of the second state in a first direction. In the roll-slide mobile terminal 100 of the second state, the size of the first direction is extended and a size of a display unit 151 arranged on a front surface becomes greater than the first state. A direction along which the roll-slide mobile terminal 100 is extended is referred to as a first direction, a direction along which the roll-slide mobile terminal 100 is contracted to be shifted from the second state to the first state is referred to as a second direction, and a direction vertical to the second direction is referred to as a third direction.

In a first state of the roll-slide mobile terminal 100 according to the present invention like a bar-type mobile terminal, a screen is expanded and changed into a second state. The flexible display unit 151 is partially located in a rear surface in the first state and then moved in the second state such that it may cover a front surface of the frame widened in a horizontal direction in the second state. Here, the horizontal direction may be the direction in which the roll-slide mobile terminal 100 is expanded in a horizontal direction shown in the drawings. The horizontal direction may be a vertical direction according to a direction in which the roll-slide mobile terminal 100 stands.

For easy and convenient description sake, the area of the display unit 151 that is located in the front surface of the roll-slide mobile terminal 100 may be defined as the first area and the area located in the rear surface of the roll-slide mobile terminal 100 may be defined as the second area. The extents of the first area and the second area may be changed based on the current state of the roll-slide mobile terminal 100.

In this way, a flexible display unit 151 which is bent may be used as the display unit such that the position of the display unit may be varied. The flexible display means a display, which is manufactured on a thin and flexible substrate capable of being curved, bent, folded, twisted or rolled like a paper, lightweight and robust not to be easily broken while maintaining characteristics of the existing flat panel display.

Also, an electronic paper is based on a display technique to which a feature of a general ink is applied, and is different from the existing flat panel display in that it uses reflective light. The electronic paper may change information by using electrophoresis that uses a twist ball or capsule.

In a state that the flexible display unit 151 is not deformed (for example, the state that the flexible display unit 151 has an infinite curvature radius, hereinafter, referred to as base state), a display area of the flexible display unit 151 becomes a plane. In a state (for example, the state having a finite curvature radius, hereinafter, referred to as a deformation state) deformed by an external force from the base state, the display area may be a curved surface. As shown, information displayed in the deformation state may be visual information output to the curved surface. This visual information is implemented as luminescence of unit sub-pixels arranged in a matrix arrangement is controlled independently. The unit sub-pixel means a minimum unit for implementing one color.

The flexible display unit 151 may be arranged in a bent state (for example, the state bent in a vertical or horizontal direction) not a flat state in the base state. In this case, if an external force is applied to the flexible display unit 151, the flexible display unit 151 may be deformed in a flat state (or less bent state) or a more bent state.

Meanwhile, the flexible display unit 151 may implement a flexible touch screen in combination with a touch sensor. If a touch is performed for a flexible touch screen, the controller 180 (see FIG. 1) may perform a control corresponding to such a touch input. The flexible touch screen may be configured to sense a touch input even in the deformation state as well as the base state.

The touch sensor senses a touch (or touch input) applied to the touch screen by using at least one of various touch modes such as a resistive film mode, a capacitance mode, an infrared mode, an ultrasonic mode, and a magnetic field mode.

As an example, the touch sensor may be configured to convert a change of a pressure applied to a specific portion of the touch screen or a change of capacitance occurring in the specific portion to an electric input signal. The touch sensor may be configured to allow a touch target, which performs a touch on the touch screen, to detect a touch position, a touch area, a touch pressure and touch capacitance on the touch sensor.

The roll-slide mobile terminal 100 according to this modified embodiment may include a deformation sensing means capable of sensing deformation of the flexible display unit 151. The deformation sensing means may be included in the sensing unit 140 (see FIG. 1).

The deformation sensing means may be provided in the flexible display unit 151 or a case 102 to sense information related to deformation of the flexible display unit 151. In this case, the information related to deformation may include a direction of the flexible display unit 151 which is modified, a modified level, a modified position, a modified time and restored acceleration of the deformed flexible display unit 151. In addition, the information related to deformation may include various kinds of information to be sensed by bending of the flexible display unit 151.

Also, the controller 180 may modify information displayed on the flexible display unit 151 or generate a control signal for controlling functions of the roll-slide mobile terminal 100, on the basis of the information related to deformation of the flexible display unit 151 sensed by the deformation sensing means.

State deformation of the flexible display unit 151 is not limited to deformation caused by an external force. For example, when the flexible display unit 151 has the first state, the first state may be modified to the second state by a command of a user or an application. In this way, in order that the flexible display unit 151 is modified without external force, the flexible display unit 151 may include a drive unit 200.

The flexible display unit 151 may be bent 180 degrees. Some area of the flexible display unit 151 may be positioned on the front surface and the other area may be positioned on the rear surface of the roll-slide mobile terminal 100. The overall area of the flexible display unit 151 is fixed such that the extent of the area located in the rear surface (the second area) may decrease if the extent of the area located in the front surface (the first area) increases.

Referring to FIG. 3, the roll-slide mobile terminal 100 includes a first frame provided as a base frame and having a battery 191 and a main board 181 loaded therein; a second frame 102 that is able to slide with respect to the first frame 101. As shown in FIG. 3, a pair of second frames 102 may be coupled to both horizontal sides of the first frame 101 to extended along both directions. As one alternative example, one second frame 102 may be coupled to a horizontal side of the first frame 101 to be extended along only one direction.

In the first state, the second frame 102 may partially overlap with a front surface of the first frame 101, and directly contact with a rear surface of the flexible display unit 151 such that it may be defined as a support portion 1011 and 1021. A plurality of first support portions 1011 horizontally projected from a front portion 1012 of the first frame 101 may be arranged in a vertical direction. A second support portion 1021 of the second frame 102 may be arranged between the first support portions 101. The second support portion 1021 may be a bar-type member horizontally extended like the first support portion 1011 and it may be inserted in the first frame 101.

The first support portion 1011 and the second support portion 1021 may be alternately arranged to support the rear surface of the extended flexible display unit 151. When a gap between the first and second support portions 1011 and 1012 is narrow, the first and second support portions 1011 and 1012 are able to support the expanded flexible display unit 151 at dense intervals and then prevent the deflection of the flexible display unit 151 in the second state.

When using one second frame 102 as shown in FIG. 4, the number of the first support portions 1011 may be equal to that of the second support portions 1012 by 1 to 1 ratio. In the roll-slide mobile terminal 100 including two second frames 102 as shown in FIG. 3, two second support portions 1021 of the second frames 102 may be inserted in the first frame 101. Accordingly, the intervals of the first support portions 1011 shown in FIG. 3 may be wider than the intervals shown in FIG. 4.

Figure 5:
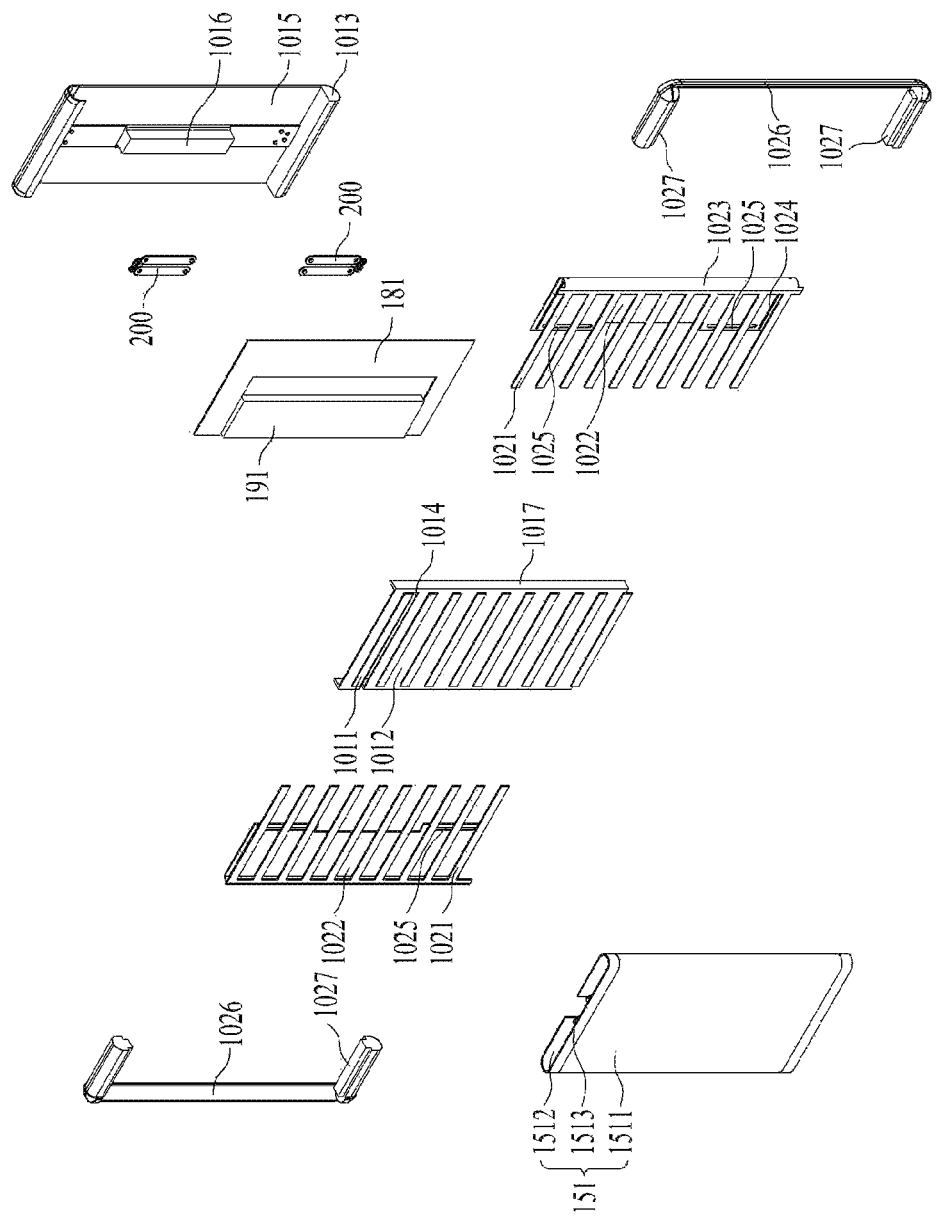
FIG. 5 is an exploded perspective view of the roll-slide mobile terminal according to the present invention, viewed in a rear direction.

FIG. 5 is an exploded perspective view of the roll-slide mobile terminal according to the present invention, viewed in a rear direction. The roll-slide mobile terminal 100 may include the first frame 101, the second frame 102 and the flexible display unit 151. It may further include a drive unit 200 configured to facilitate the movement of the second frame 102.

In the flexible display unit 151 shown in FIG. 4, the first area is limited as the area located on the front surfaces of the first and second support portions 1011 and 1021 in the first state. The other area may cover the second frame 102 and folded towards the rear surface of the second frame while one end of the flexible display unit 151 is moving from the rear surface of the second frame 102 in a horizontal direction.

The flexible display unit 151 according to the present invention may include a display panel 1511 configured to output an image; and a back plate 1512 configured to support a rear surface of the display panel 1511. The display panel 1511 may be a flexible display device (e.g., OLED). The back plate 1512 may be provided on the rear surface of the display panel 1511 and a metal plate that is flexible together with the display panel 1511, with a predetermined rigidity strong enough to support the display panel 1511 may be used as the back plate 1512.

The back plate 1512 and the display panel 1511 may be bonded to each other by using an adhesive material. Examples of the adhesive material may include OCA that is a double-sided tape extendible within a predetermined range (e.g., a foam material). Accordingly, the adhesive material may offset a slip phenomenon that might be caused by a difference between the curvature radius of the back plate 1512 and that of the display panel 1511. The back plate 1512 may have a predetermined rigidity so as to prevent the flexible display unit 151 from deflecting between the first or second support portions 1011 or 1021 spaced a preset distance apart from each other as shown in FIG. 3.

The first frame 101 may include a front portion 1012 and a rear portion 1015 configured to form a rear surface of the roll-slide mobile terminal 100. Such components as the battery 191 and the main board 181 may be loaded in a predetermined space formed between the front portion 1012 and the rear portion 1015. A first side portion 1013 may be provided on a vertical side surface of the roll-slide mobile terminal 100. The first side portion 1013 may define an exterior design of the vertical side surface of the roll-slide mobile terminal 100 and form a predetermined space together with the front portion 1012 and the rear portion 1015 to load the components, with a corresponding thickness to the space formed between the front portion 1012 and the rear portion 1015.

As shown in FIG. 5, an uneven area is formed in the front portion 1012 and a forwardly-projected area may be referred to as a first support portion 1011. In other words, the first support portion 1011 may mean the projected area vertically spaced apart from the front portion 1012 of the first frame 101. The second support portion 1021 of the second frame may horizontally slide on the front portion 1012 between the first support portions 1011.

The second support portion 1021 of the second frame 102 may include a curved portion 1023 extended in a horizontal direction like a comb and having one end connecting the second support portions 1021 with each other. The above-noted flexible display unit is wound around the curved portion 1023 such that the curved portion may have a curved surface with a predetermined curvature.

The second frame 102 may further include a third support portion 1022 arranged in a rear surface of the second support portion 1021. The third support portion may support the second area of the flexible display unit 151 in the first state. The flexible display unit 151 may include a first area supported by the first and second support portions 1011 and 1021; a second area supported by the third support portion 1022; and a third area located in the curved portion 1023.

The flexible display unit 151 may not be fixedly coupled to the second frame 102. When the second frame 102 horizontally slides from the first frame 101 to be the second state, the flexible display unit 151 may also slide on the second and third support portions 1021 and 1022 of the second frame 102.

One end of the flexible display unit 151 located on the third support portion 1022 may slide twice as far as the second frame 102 horizontally slides such that it may be sliding-movably coupled on the third support portion 1022.

A predetermined area of the first area that contacts with the first support portion 1011 in the flexible display unit 151 may be secured by using an adhesive material. Accordingly, even when the state of the roll-slide mobile terminal 100 is changed, the flexible display unit 151 is able to sliding-move on the third support portion 1022 of the second frame 102, without being pushed.

A second side portion 1027 may be further provided in a vertical area of the roll-slide mobile terminal 100 and configured to cover an expanded vertical side area in an expanded state after the second frame 102 sliding-moves. The second side portion 1027 may vertically move in the second state as one part of the second frame 102 and cover a vertical side surface of the second frame 102 to prevent an internal structure from being exposed outside.

The second side portion 1027 is insertedly fitted in the first side portion 1013 in the first state and exposed outside in the second state as shown in FIG. 2 (b). The second side portion 1027 may have a similar shape with the first side portion 1013 so as to form a continuous exterior design of the mobile terminal. In other words, when the first side portion 1013 has a gently curved surface, the second side portion 1027 may have a corresponding curved surface as well. Here, the second side portion 1027 may be insertedly located in the first portion 1013 such that it may be smaller than the first side portion 1013.

The second frame 102 may further include a third side portion 1026 configured to protect the third area of the flexible display unit 151. The third side portion 1026 may cover all of the third area or some of the third area, so as to use even the third area expanded from the first area as the output area of the screen.

The third side portion 1026 may include an opaque material or a transparent material or mixture of the two materials. In case it includes the transparent material, the transparent portion may be formed and the user is able to see an image output on the third area of the flexible display unit 151. The user is able to input a control signal via a touch sensor provided in the flexible display unit 151. For such touch input, the third side portion 1026 may include a conductive material partially provided therein. A projection may be formed in the area having the conductive material to allow the user to touch the projection so as to input a user command.

The first frame 101 may include a first reinforcement portion 1016 provided between the front portion 1012 and the rear portion 1015 and configured to support the front portion so as to some internal space. The first reinforcement portion 1016 may be arranged in an area where the third support portion of the second frame 102 is not located. As shown in FIG. 5, the first reinforcement portion may be located in a central area of the second frame. No third support portion 1022 may be provided in the area of the first reinforcement portion to prevent the overlapping of the third support portion 1022 with the first reinforcement portion 1016. It is preferred that the first reinforcement portion is located in the central area as shown in FIG. 5, even considering the loaded area of the main board 181 and the battery 191 and the second area of the flexible display unit 151.

Since the curved portion 1023 or the third side portion support the area between the front surface and the rear surface of the roll-slide mobile terminal 100 in the first state, the internal space of the roll-slide mobile terminal may be stably supported. However, in the second state, the third side portion and the curved portion 1023 are spaced apart from the first reinforcement portion 1016 in the second state such that deflection might occur between the first reinforcement portion 1016 and the curved portion 1023.

To solve the problem of deflection, the first frame 101 may further include a second reinforcement portion 1017 provided between the front portion 1012 and the third support portion 1022 of the first frame 101. The second reinforcement portion 1017 may be projected towards the rear surface from both horizontal sides of the front portion 1012 as shown in FIG. 5.

The drive unit 200 may be provided to drive the horizontal-direction sliding movement of the second frame 102. FIG. 6 is a diagram illustrating the third support portion 1022 of the second frame 102 and the drive unit 200. FIG. 6 shows the third support portion 1022 of the second frame 102 and the drive unit 200 in the roll-slide mobile terminal 100. The drawing shows the internal space of the rear surface where the components including the battery 191 are loaded, omitting the front portion 1012 and the first support portion 1011 of the first frame 101.

To arrange the pair of the third support portions 1022 not to overlap with each other, the horizontal width of the third support portion 1022 may be a half or less of the horizontal side of the roll-slide mobile terminal 100.

FIG. 6 (a) illustrates the first state and FIG. 6 (b) illustrates the second state. The drive unit 200 include a link 202 having one end rotatably coupled to the first frame 101; and a drive slot 1025 vertically extended from the third support portion 1022 of the second frame. A drive projection 2022 may be projected from the other end of the link 202 to be inserted in the drive slot 1025. When the link 202 is rotated, the drive projection may vertically move on the drive slot 1025.

Specifically, the link 202 may be rotatable on a rotation coupling portion 2021 provided in one side. The drive projection 2022 rotatable together with the rotation of the link 202 may transfer only the horizontal movement to the second frame 102, not the vertical movement. The drive projection 2022 may vertically move on the drive slot 1025 and the vertical movement of the drive projection 2022 may be offset.

When further including a motor configured to rotate the rotation coupling portion 2021 of the link 202, the second frame 102 may automatically move in a horizontal direction. When the user moves the second frame 102 in the horizontal direction, the link 202 arranged in a vertical direction as shown in (a) may be arranged in a horizontal direction as shown in (b). When the user changes the second state into the first state, the position of the link 202 may be changed from the horizontal direction into the vertical direction.

When including the pair of the second frames 102, a gear structure shown in FIG. 6 (b) may be further provided to facilitate symmetric movement of the second frames 102.

The gear structure may include a first saw-toothed wheel formed in each one side of the two links 202; and a second saw-toothed wheel rotatably coupled to the rear portion 1015 of the first frame by rotatably engaging with the first saw-toothed wheel. A pair of two second saw-toothed wheels may be provided to rotate while engaging with each other in the reverse directions, respectively.

While the second saw-toothed wheel 201 is rotatably engaging with the first saw-toothed wheel, the link 202 is rotated in the reverse direction as shown in FIG. 6 (b) and the pair of the second frames 102 is able to slide in the horizontally symmetric directions, respectively.

A slide slot 1024 may be formed in the third support portion to sliding-move the other end of the flexible display unit 151 from the third support portion 1022 of the second frame 102. The slide slot 1024 may be extended in a horizontal direction and configured to sliding-move in a state where the slide projection 1513 coupled to the flexible display unit 151 is inserted in the slide slot.

The slide projection 1513 may be directly formed in the back plate of the flexible display unit 151 mentioned above or in an auxiliary frame (a third frame) configured to be coupled to the back plate of the flexible display unit 151, only to guide the sliding-movement of the flexible display unit 151.

When the first state is changed into the second state, the movement of the second area of the flexible display unit 151 towards the front surface of the second support portion 1021 may be performed in communication with the sliding movement of the second frame 102. However, when the second state is changed into the first state, a display wrinkle or a lift defect from the second support portion 1021 might occur on the flexible display unit 151.

When the slide projection 1513 moves in a state of being inserted in the slide slot 1024, such a lift defect may be prevented. To easily change the second state into the first state more smoothly or effectively prevent the lift defect, an elastic member 203 may be further provided as shown in FIG. 6. The elastic member 203 may be provided between the slide projection and the drive projection 2022 of the link 202 and configured to provide a force for moving the flexible display unit 151 located on the second support portion 1021 towards the third support portion 1022 of the rear surface, when the user pulls the drive projection 2022 to change the second state into the first state.

More specifically, when the second frame 102 sliding-moves towards the first frame 101 to change the second state into the first state of the roll-slide mobile terminal 100, the link 202 horizontally arranged as shown in FIG. 6 (b) may be vertically rotated as shown in FIG. 6 (a). At this time, the elastic member 203 may provide elasticity for pulling the slide projection 1513 to move the flexible display unit 151 towards the rear surface. When the user pushes the second frame 102 towards the first frame 101 with a weak strength, the second state is able to be switched into the first state more easily by the elasticity of the elastic member 203.

In the drawing, the elastic member 203 has a coil spring shape but embodiments of the present invention are not limited thereto. The drive force for moving the flexible display unit 151 towards the rear surface in changing the second state into the first state by using diverse types of the elastic member 203.

A pair of drive units 200 may be provided in upper and lower areas symmetrically as shown in FIG. 5. If the force is applied only to one are, torsion might occur in changing first state into the second state or vice versa. The drive units 200 provided in both upper and lower sides may guide the movements of the second frame 102 and the flexible display unit 151.

FIG. illustrates another embodiment of the roll-slide mobile terminal 100. FIG. 7 (a) illustrates a front surface of the roll-slide mobile terminal 100 and FIG. 7 (b) illustrates the front surface, with omitting the components including the battery 191 and the main board 181 loaded therein like FIG. 6.

In the drive unit 200 mentioned above in reference to FIG. 6, the pair of the links 202 are rotatable while engaging with the second saw-toothed wheel 201 such that the pair of the links 202 may be synchronized and rotated at the same time. However, in this embodiment, the pair of the links 202 may be movable independently. Only when the user pulls only one second frame 102a located in one side, the other second frame 102b located in the other side may fixed and only the second frame 102a may slide.

FIG. 8 illustrates a further embodiment of the roll-slide mobile terminal 100. In this embodiment, only second frame 102 may be provided. Similar to the embodiment including the pair of the second frames 102, the second frame 102 of this embodiment may include a slide slot 1024 and a drive slot 1025. A slide projection 1513 that is movable along the slide slot 1024 may guide the sliding movement of the flexible display unit 151. A drive projection 2022 movable along the drive slot 1025 may guide the sliding movement of the second frame 102. An elastic member 203 for connecting the drive projection 2022 and the slide projection 1513 with each other may assist the movement of the slide projection.

When one first frame 101 is provided as shown in FIG. 8, one link 202 may be also provided. At this time, the moving distance of the second frame 102 has to be longer in this embodiment than the above-noted embodiment such that the link 202 has to be longer. When one second frame 102 is provided as shown in FIG. 8, the third support portion 1022 may be larger than the third support portion when two second frames 102 are provided.

FIG. 9 is a diagram to describe the sensing unit of the roll-slide mobile terminal 100. In the roll-slide mobile terminal 100, the size of the first area of the flexible display unit 151 may be changeable in several steps or serially. Except the first state shown in FIG. 2 (a) and the second state that is a completely expanded state shown in FIG. 2 (a), the first area may be expanded in a middle size between the sizes in the two states.

FIG. 9 (a) is an A-A sectional diagram of FIG. 2 and FIG. 9 (c) is a B-B sectional diagram of FIG. 2. FIG. 9 (b) is a sectional diagram in the second state that is a middle state between FIG. 2 (a) and FIG. 2 (b).

As shown in FIG. 5, the flexible display unit 151 may include a fixed sensing unit 1451 extended in a horizontal direction; and a movable sensing unit 1452 coupled to the second frame 102 and movable on the fixed sensing unit 1451 in the horizontal direction. The moving distance of the second frame 102 may be sensed according to the position of the movable sensing unit 1452 on the fixed sensing unit 1451 and the size of the first area of the flexible display unit 151 may be calculated based on the result of the moving distance.

The control unit may be implemented to sense the position of the movable sensing unit 1452 by using the fixed sensing unit 1451 and determine the size of the first area. After that, the control unit may control the flexible display unit 151 and output a screen on a larger area in the state shown in FIGS. 9 (b) and (c) than the state shown in FIG. 9 (a).

When the movable sensing unit 1452 is provided in the rear surface of the second support portion 1021, the front portion 1012 of the first frame may be located between the second support portion 1021 and the first support portion. Accordingly, an open portion 1014 may be provided in the front portion 1012 and the open portion 1014 may be extended in the horizontal direction. The movable sensing unit 1452 may be projected towards the rear surface via the opening portion 1014 and then contact with the fixed sensing unit 1451. When the movable sensing unit 1452 is provided in the front surface of the third support portion 1022 and the fixed sensing unit 1451 is provided in the rear surface of the main board 181, the opening portion 1014 may be omitted.

FIG. 9 illustrates that the pair of the second frames 102 are moving in symmetry. However, when the pair of the second frames can move independently as shown in FIG. 7, two fixed sensing units 1451 and two movable sensing units 1452 may be provided to figure out the movements of the two second frames 102, respectively.

FIG. 10 is a diagram to describe the control of the output screen based on the result of the sensing performed by the sensing units 1451 and 1452 and illustrates the pair of the second frames 102 that are movable independently as one embodiment. A longitudinal direction becomes a horizontal direction and the horizontal direction mentioned above becomes the vertical direction shown in the drawing. For the identical description, the direction in which the second frames 102 are moving is defined as the horizontal direction.

The size of the horizontal direction first area is 'a' in the state shown in FIG. 10 (a). In the state shown in FIG. 10 (b), the second frames 102 are moving and the first area of the flexible display unit 151 is partially expanded. When the first area of the flexible display unit 151 is expanded, the screen output in the first state may be output as a larger screen or an auxiliary screen 151b may be additionally provided as shown in FIG. 10 (b). A menu of a playing list, a thumbnail of an important scene, an image taken at a different angle or an image of another channel may be displayed on the screen 151b.

A different screen may be provided on a moved one of second frames 102 or a direction in which the roll-slide mobile terminal 100 is arranged. For example, when one second frame 102 located in the other side of the roll-slide mobile terminal 100 is moved as shown in FIG. 10 (b), the image taken at a different angle may be provided. When the other second frame 102 located in one side is moved, the image of another channel may be displayed. When the second frame is arranged in the vertical direction along the longitudinal direction, the screen provided on the expanded second frame 102 may be controlled to be enlarged and output.

As described above, since the roll-slide mobile terminal of the present invention does not limit a point where the flexible display unit 151 is folded to a specific position, durability of the flexible display unit 151 may be improved.

Also, since the flexible display unit 151 may stably be supported when it is extended, it is possible to minimize difficulty in a touch input.

Also, the flexible display unit 151 may be prevented from being damaged by external impact at the side where the flexible display unit 151 is folded.

Also, the image optimal sized to the size of the first area of the flexible display unit 151 may be provided by sensing the expanded size of the flexible display unit 151. Accordingly, use convenience may be enhanced.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

What is claimed is:

1. A mobile terminal comprising:
   a body comprising a first frame and a second frame configured to slidingly move relative to the first frame in a horizontal direction, causing a change from a first state to a second state in which the body is expanded; and
   a flexible display comprising a first area provided on a front surface of the body, a second area provided on a rear surface of the body, and a third area between the first area and the second area and surrounding a curved side portion of the second frame,
   wherein the first frame comprises a plurality of first support portions, each of the plurality of first support portions extended in the horizontal direction and vertically spaced a preset distance apart from another one of the plurality of first support portions,
   wherein the second frame comprises:
      a plurality of second support portions, each of the plurality of second support portions provided between respectively corresponding first support portions; and
      a third support portion provided in a front side of the second area of the flexible display and extended in parallel with the plurality of second support portions, and
   wherein the curved side portion of the second frame is provided between a first end of the plurality of second support portions and a first end of the third support portion.

2. The mobile terminal of claim 1, wherein:
   the first frame further comprises a front portion in which the plurality of first support portions are provided and a rear portion configured to cover a rear surface of the second frame;
   the plurality of first support portions are projected from the front portion towards the front surface by a height corresponding to a thickness of the plurality of second support portions; and
   the plurality of second support portions are provided on a front surface of the front portion.

3. The mobile terminal of claim 1, wherein the first frame further comprises a first side portion configured to form exterior designs of upper lower sides.

4. The mobile terminal of claim 3, wherein the second frame further comprises a second side portion inserted in the first side portion and configured to be exposed outside in the second state.

5. The mobile terminal of claim 1, further comprising:
   a third side portion configured to cover at least a predetermined area of the third area of the flexible display.

6. The mobile terminal of claim 1, further comprising:
   a slide slot formed in the horizontal direction in the third support portion; and a slide projection projected from one end of the flexible display and configured to be inserted in the slide slot and move along the slide slot when the second frame moves slidingly.

7. The mobile terminal of claim 1, further comprising:
a drive unit configured to move the third support portion in the horizontal direction,
wherein the drive unit comprises:
a drive slot extended from the third support portion in a vertical direction;
a link having one end rotatably coupled to the first frame; and
a drive projection projected from another end of the link and inserted in the drive slot.

8. The mobile terminal of claim 7, further comprising:
a pair of second frames, each of the pair of second frames coupled to a respectively corresponding horizontal side of the first frame,
wherein the pair of second frames are configured to slide in opposite directions; and
a pair of links rotatably coupled to a center of the first frame and configured to be rotatable in the opposite directions.

9. The mobile terminal of claim 8, further comprising:
a pair of first saw-toothed wheels, each first saw-toothed wheel formed in one end of a corresponding one of the pair of links; and
a pair of second saw-toothed wheels, each second saw-toothed wheel configured to be rotatable by engaging with a corresponding one of the pair of first saw-toothed wheels,
wherein the pair of second saw-toothed wheels are rotated in opposite directions by engaging with each other.

10. The mobile terminal of claim 8, further comprising:
a slide slot formed in the third support portion in the horizontal direction;
a slide projection projected from one end of the flexible display and configured to be inserted in the slide slot and move along the slide slot when the second frame moves slidingly; and
an elastic member provided between the slide projection and the other end of the link.

11. The mobile terminal of claim 1, wherein the first frame further comprises:
a front portion in which the plurality of first support portions are provided;
a rear portion configured to cover a rear surface of the second frame; and
a first reinforcement portion provided in a position not overlapping with the second frame and having a thickness corresponding to a space formed between the front portion and the rear portion.

12. The mobile terminal of claim 11, wherein the first frame further comprises:
a second reinforcement portion having a thickness corresponding to a space formed between the third support portion and the front portion.

13. The mobile terminal of claim 1, further comprising:
a main board and a battery that are located in the first frame;
a fixed sensing unit extended on the main board in the horizontal direction;
a movable sensing unit coupled to the second frame and configured to be movable in a state of contacting the fixed sensing unit when the first state is changed to the second state; and
a controller configured to:
sense a position of the movable sensing unit on the fixed sensing unit;
calculate an extent of the first area provided in the flexible display based on a result of the sensing; and
further configured to
cause output of an image on the first area.

14. A mobile terminal comprising:
a first frame comprising a plurality of first support portions, each of the plurality of first support portions extended in a horizontal direction and vertically spaced a preset distance apart from another one of the plurality of first support portions;
a second frame comprising a plurality of second support portions, each of the plurality of second support portions provided between respectively corresponding first support portions,
wherein the plurality of second support portions are configured to slidingly move relative to the first frame in the horizontal direction, causing a change from a first state to a second state in which the mobile terminal is expanded;
a flexible display comprising a first area provided on a front surface of the plurality of first support portions and a second area provided on a rear side of the first area by being folded to surround the second frame in the first state,
wherein the flexible display comprises a touch screen and a touch sensor;
a sensing unit sensing a position of the second frame respect to the first frame; and
a controller configured to:
generate a control signal for controlling a function of the mobile terminal in response to a touch input received via the touch screen and sensed by the touch sensor;
calculate a size of the first area based on the position of the second frame sensed by the sensing unit; and
cause the flexible display to output of an image corresponding to the size of the first area on the first area.

15. The mobile terminal of claim 14, wherein the sensing unit comprises:
a movable sensing unit coupled to the second frame; and
a fixed sensing unit placed at the first frame, extended in the horizontal direction, and configured to sense a position of the movable sensing unit on the fixed sensing unit.

* * * * *